Patented Sept. 13, 1938

2,129,694

UNITED STATES PATENT OFFICE 2,129,694

ESTERS OF METHACRYLIC ACID

Emmette F. Izard, Elsmere, Del., assignor to E. I. du Pont de Nemours & Company, Wilmington, Del., a corporation of Delaware No Drawing. Application July 14, 1934,
Serial No. 735,282

6 Claims. (Cl. 260—2)

The present invention relates to new compositions of matter, to methods for their preparation, and more particularly to the methacrylic acid esters of the alkylene glycols and glycerols in which all but one of the hydroxyl groups have been replaced by a substituent group.

An object of the present invention is to provide new compositions of matter and a process for their preparation. A further object of the invention is to provide a new polymerizable composition of matter together with a process for its polymerization. A still further object of the invention is to provide a process for the preparation of the methacrylic acid esters of the alkylene glycols and glycerols in which all but one of the hydroxyl groups have been replaced by a substituent group, which may be obtained by the ester interchange method of interacting a lower alkyl ester of methacrylic acid with the alcohol in the presence of a suitable catalyst, or by the reaction of the alcohol with a methacrylyl halide. Another object of the invention is to provide mixtures or interpolymers of the polymerized resin with other polymerizable compounds of methacrylic and acrylic acids. Other objects and advantages of the invention will hereinafter appear.

There have been prepared in accord with this invention valuable esters of methacrylic acid which have been found useful as prepared and even more valuable when polymerized. These compounds may be generally described as methacrylic acid esters of the glycerols and the mono-, di-, tri-, tetra-, penta-, and higher alkylene glycols, in which all of the hydroxyl groups but one have been replaced by a substituent group, such, for example, as an ether, ester, halide, nitrate, cyanide, amine, etc. More specifically, these compounds include ethylene glycol monomethyl ether, ethylene glycol monoethyl ether, ethylene glycol monopropyl ether, and the higher ethers of these ethylene glycols; propylene glycol monomethyl, ethyl, propyl, or higher ethers, including dimethylene glycol alkyl ethers and alpha-propylene glycol ethers; and the higher substituted methylene glycols as, for example, tetramethylene glycol monoalkyl ether, pentamethylene glycol monoalkyl ether, decamethylene glycol monoalkyl ether, and the like. The present invention likewise contemplates the methacrylates of the dialkyl glycerols, e. g. dimethyl glycerol, diethyl glycerol, methyl ethyl glycerols, glycerol diethyl ether, glycerol ethyl methyl ether, and the like. In lieu of the ethers of the above designated and equivalent alkylene glycols the esters, halides, nitrates, cyanides, substituted or unsubstituted amines, and the like, may be reacted to obtain corresponding methacrylates as will be more particularly characterized hereinafter, such compounds including more specifically ethylene glycol monoacylate, diethylene glycol monoacylate, propylene glycol monoacylate, glycollic mononitrate, ethylene glycol monocyanide, and like substituted glycols.

The following specific examples are furnished to illustrate methods of preparing the new compositions of matter, but it will be understood that the invention is not limited to the details therein given.

Example 1.—4.2 parts of sodium were dissolved in 72 parts of ethylene glycol monoethyl ether by heating under a reflux condenser on a steam bath. The alcoholate was cooled and 320 parts of methyl methacrylate and 19.2 parts of hydroquinone added. The mixture was then heated on the oil bath which was maintained at a temperature of 150° C. under a 48" column fitted with a still head. The distillate was collected at such a rate that the temperature at the head of the column remained at or near the boiling point of the methanol-methyl methacrylate binary. Heating was continued until no more methanol distilled off (i. e. until the distillate no longer showed a water soluble portion). The cold reaction mixture was dried over a suitable desiccating medium, the solvents removed by fractional distillation and the resulting mixture fractionated under reduced pressure. A 54.2% yield of ethylene glycol monoethyl methacrylate was obtained. The ester had a boiling point of 52° C. at 3 mm., a density at 25° C. of 0.964, and a saponification number of 356,—theoretical 355.

Example 2.—152 parts of ethylene glycol monomethyl ether, 800 parts of methyl methacrylate, 350 parts of benzene, 48 parts of hydroquinone, and 5 parts of sulfuric acid (concentrated) are mixed and warmed on the water bath until solution is complete. The solution was then heated on an oil bath maintained at a temperature of 140–145° C., under a 48" fractionating column fitted with a condenser arranged for controlled reflux. The distillate, which consisted of a benzene-methanol binary, was collected at such a rate that the temperature at the head of the column remained at 58–59° C. Heating was continued until the temperature at the head of the column could not be maintained at 58–59° C. The progress of the reaction was followed by measuring the amount of methanol in the distillate as shown by the portion that would dissolve in water. The cold reaction mixture was dried over a suitable desiccating medium, the solvents removed by fractional distillation, and the resulting mixture fractionated under reduced pressure. An 80% yield of ethylene glycol monomethyl ether methacrylate was obtained, having a boiling point of 58-63° C. at 10 mm.

Example 3.—162 parts of diethylene glycol monobutyl ether were mixed with 400 parts of methyl methacrylate, 2.8 parts of concentrated sulfuric acid and 24 parts of hydroquinone (all parts are given by weight) and the resulting mixture heated on the water bath until the solution was complete. The solution was then heated on an oil bath maintained at a temperature of approximately 150° C., under a 48" fractionating column fitted with a condenser arranged for controlling reflux. Distillate was collected at such a rate that the temperature at the head of the column remained at the boiling point of the methanol-methyl methacrylate binary (64°). The cold reaction mixture was neutralized and then washed and dried over a suitable desiccating medium. The solvents were removed from the dried product by fractional distillation, and the ester finally separated by fractionation under reduced pressure. A 71.8% yield of diethylene glycol monobutyl ether methacrylate was obtained. It had a boiling point of 116° C. at 4 mm., and a saponification number of 243—theoretical 244.

Example 4.—The process of Example 1 was repeated with 800 parts of methyl methacrylate, 450 parts of benzene, 5 parts of concentrated sulfuric acid, 160 parts of ethylene chlorohydrin, and 50 parts of hydroquinone. The temperature of the oil bath was maintained at approximately 150° C. and after 14 hours a 58% yield of beta-chlorethyl methacrylate was obtained, which had a boiling point of approximately 61-64° C. at 11 mm., and a density of 1.106 at 20° C. with a 23.5% chlorine content (theoretical 23.9).

Example 5.—100 parts of betadiethyl amino ethanol, 340 parts of methyl methacrylate, 450 parts of dry benzene, and 20 parts of p-phenylene diamine were mixed and heated to boiling on an oil bath under a 48" column. After the solution had started to boil the addition of the catalyst, a methanol solution containing 20% sodium methylate, was started and it was added in small portions at short intervals while the reaction was being carried out on an oil bath maintained at a temperature of approximately 130–145° C. The total catalyst added was approximately 20 parts. The catalyst solution was added from a dropping funnel thru a side neck in the reaction flask. The course of the reaction was followed by measuring the amount of methanol (water soluble portion) in the distillate. The addition of catalyst was generally stopped a short time before the theoretical amount of methanol was obtained. The product was neutralized, dried, vacuum distilled and freed from betadiethyl amino ethanol by repeated extraction with water. A 52% yield of betadiethyl amino ethyl methacrylate was obtained. This ester has a boiling point of 85-88° C. at 5 mm. It is soluble in dilute acids and common organic solvents.

Other methods may, of course, be employed for the preparation of the enumerated methacrylates, such, for example, as are disclosed in the copending applications of Barrett and Strain, Serial Nos. 735,276, 735,278 and 735,279, filed July 14, 1934 or by any of the well known esterification or ester interchange processes.

The methacrylates as prepared in accord with the examples, are usually mobile liquids, but may sometimes be solids. The esters as thus produced are monomeric and may be polymerized according to the invention by means of heat, light, and/or a catalyst, e. g. as described for the polymerization of organic vinyl esters in British specification 15271/1914. Preferably, a catalyst, such as oxygen, ozone, an organic peroxide, an ozonide, etc. is employed. Other catalysts which may be used include aluminum sulfate, boron fluoride, the mineral acids, e. g. hydrochloric and sulfuric acids, as well as organic acids, more particularly acetic and methacrylic acids, etc., and also the anhydrides and acid halides of such organic acids, etc., metal salts of fatty acids and resinic acids, e. g. cobalt linoleate and resinate, manganese oleate and rosin, etc. The polymerization may be effected in the presence or absence of a solvent for both monomer and polymer, or in the presence of a solvent for the monomer and a non-solvent for the polymer, or the monomer may be emulsified and then polymerized. Preferably, polymerization is carried out at a moderate temperature, i. e. between 60-100° C., although higher temperatures such as, for example, 130° C. or higher, may be employed. The polymerization reaction is usually strongly exothermic and it may be necessary to control the temperature by cooling devices, tho polymerization may be carried out in apparatus which may or may not be provided with condensing devices, or in suitable pressure equipment.

As indicated, various methods may be employed for polymerizing the monomeric esters of methacrylic acid and it has been found that the properties of the resins, the physical properties to a large extent and the chemical properties to a lesser extent, are altered considerably by the type of polymerizing process utilized. The process described in the copending applications of D. E. Strain, Ser. Nos. 668,080 and 704,753, may be used, if desired.

Methods illustrating the polymerization of the esters will now be described, but it will be understood that other suitable polymerizing processes may be employed.

Example 6.—612 parts (parts are given by weight) of ethylene glycol monoethyl ether methacrylate monomer was dissolved in 1243 parts of methanol in a bottle provided with a stopper, then 6.25 parts of powdered benzoyl peroxide added to this solution. After the benzoyl peroxide was all dissolved, 1250 parts of water insufficient to cause permanent turbidity was added. The bottle was securely closed and set in an oven at approximately 85° C. After the polymerization was complete in approximately 48 hours, the mixture was allowed to cool. The liquid was decanted; the resin removed from the bottle, and was cut into small pieces and dried in a vacuum desiccator. The polymer was obtained in an 82% yield as a clear, colorless, flexible solid resin, relatively insoluble in all common organic solvents.

Example 7.—100 parts (parts are given by weight) of ethylene glycol monomethyl ether methacrylate monomer was dissolved in 300 parts of methanol in a bottle provided with a stopper, then 1 part of powdered benzoyl peroxide added to this solution. After the benzoyl peroxide was all dissolved, 250 parts of water insufficient to cause permanent turbidity was added. The bottle was securely closed and set in an oven at approximately 85° C. After the polymerization was complete in approximately 3 days, the mixture was allowed to cool. The liquid was decanted, the resin removed from the bottle, and was cut into small pieces and dried in a vacuum desiccator. The polymer was obtained in a 91% yield as a semi-fused white mass which was relatively insoluble in all common organic solvents. The resin was placed in a disk shaped mold in which it was subjected to a temperature of 90° C. and a pressure of approximately 4000 pounds per square inch for approximately 15 minutes. A water clear, tough molded disk was obtained which softened at a temperature of 30° C.

*Example 8.*—Undiluted methylene glycol monomethyl ether methacrylate monomer containing 1% benzoyl peroxide was heated to a temperature of 100° C. After 5 hours a soft, slightly yellow and slightly sticky solid polymer was obtained which was soluble in toluene and acetone. It had a viscosity of 25° C. of 0.06 poise (15% solution in toluene). The resin was compatible with nitrocellulose.

*Example 9.*—The polymerization process of Example 6 was repeated using 48.5 parts of diethylene glycol monobutyl ether methacrylate monomer, 108 parts of methanol, 0.5 part of benzoyl peroxide, and 75 parts of water. After 48 hours at 65° C. an 80% yield of a slightly yellow, clear, sticky, rubbery polymer was obtained which was relatively insoluble in all common organic solvents.

*Example 10.*—Undiluted diethyl aminoethyl methacrylate monomer containing no polymerizing catalyst polymerizes at low temperatures very readily, in fact polymerization has occurred at temperatures as low as 0° C. Polymerization for 18 hours at 100° C. produced a 100% of a bubble-free, amber colored, transparent, firm but rubbery, slightly tacky polymer which gelled in toluene but was relatively insoluble in butyl acetate, gasoline and acetone.

*Example 11.*—The polymerization process of Example 6 was repeated using 50 parts of beta-chlorethyl methacrylate monomer, 200 parts of methanol, 0.5 part of benzoyl peroxide, and 100 parts of water. After 27 hours at 65° C. a 96% yield of the polymer as a white powder was obtained. It is soluble in butyl acetate, acetone and toluene, has a viscosity at 20° of 0.05 poise (5% solution in toluene at 25° C.) and is compatible with nitrocellulose.

The resin was placed in a disk shaped mold and subjected to a temperature of 100° C. and a pressure of 1500 pounds per square inch for approximately 15 minutes. A clear, colorless, fairly strong disk was obtained which softened at 68° C.

Valuable products may be obtained by utilizing the polymers of the esters described herein together with equivalents or homologues thereof admixed with other polymeric acrylic or methacrylic esters or other derivatives. Especially valuable products result if the monomeric esters are mixed and then polymerized. By this method interpolymers having a wide range of characteristics are made. Due to the unique characteristics of methyl methacrylate polymer which is a hard resin having a high melting point, its admixture with the polymeric esters of methacrylic acids herein described or interpolymers thereof are particularly well adapted for many uses.

The polymerized esters of methacrylic acid as well as mixtures or interpolymers thereof with other polymerizable compounds are particularly well suited for thermoplastic molding. The monomer may be polymerized and/or preformed prior to placing in the mold and then may be molded in accord with the usual procedural steps employed particularly in the molding of methyl methacrylate as described in the Rowland Hill patent, 1,980,483 of November 13, 1934. The mold preferably is hot, prior to the introduction of the polymerization product, is then closed and the material so confined heated and pressed, the temperatures ranging from approximately 80–150° C., and pressures from 200 pounds per square inch upward are usually sufficient to give a suitably molded product. The presence or absence of plasticizers will, of course, alter considerably the molding conditions and it is usually advantageous to have present plasticizers to alter the physical characteristics of the resulting product to fit the particular need for which the molded article is to be used.

The masses resulting from polymerization can immediately (i. e. in the state they have been obtained) be made into useful articles. It is possible to obtain the required articles if, for instance, the polymerization be carried out while the initial material is in a suitable mold, for instance one of steel or glass, so that the articles, for example, umbrella handles, fountain pen barrels, buttons, and the like, are obtained directly from the mold. Or, if desired, the masses may be worked to the required shape by softening with suitable softeners or plasticizers in the presence of volatile solvents and, after shaping, evaporating the solvent.

The polymerization products may be worked into the required shapes in various ways; for example, they can be softened and kneaded, rolled, compressed, drawn into wires, threads or the like, or the masses can be mixed with additional substance, and rolled into plates, or films, or they may be pressed into the required shapes such as buttons, combs, and the like.

The solid masses can be worked by cutting, sawing, filing, or the like, whether they be obtained directly by polymerization, or after special treatment of the polymerized masses. These shaped articles may be polished, and parts connected together by smearing the faces to be connected with a suitable solvent, such as acetone, epichlorhydrin, or the corresponding methacrylic acid ester.

The polymerization product dissolved in a suitable solvent which may or may not be the monomer may be transformed into a useful article, e. g. films by casting and then evaporating the solvent, or by extruding thru a suitable orifice into a precipitating bath or drying atmosphere. The polymer may be recovered from such solutions by precipitation with a suitable non-solvent for the polymer.

The properties of the resulting masses may be widely varied by modification with plasticizers, e. g. dibutyl phthalate, tricresyl phosphate, etc., drying, semi-drying and non-drying oils, synthetic and natural resins, waxes, bitumens, cellulose derivatives, e. g. cellulose nitrate and ethyl cellulose, etc., pigments, fillers, and dyes, etc. Thus it is possible to produce instead of hard glass-like masses, also soft and flexible masses. Likewise, by the addition of suitable coloring means, it is possible to produce masses, or objects, having any desired color effects. The incorporation of the additions can be effected either before or during the polymerizing process, or the additions can be made to the already formed polymerization products in a suitable condition.

If the polymerization of an organic methacrylic acid ester be carried out in an incomplete manner, a syrupy solution of the polymerization product containing some unchanged methacrylic acid ester is obtained. This product can be utilized either directly or along with other solvents or diluents for the production of substances to be used for coating, painting or impregnating purposes. If, for instance, a porous substance such as wood, paper, textile fabric, artificial stone, or the like be coated with the said syrupy solution or be impregnated therewith, very resistant coating and impregnations are obtained on completing the polymerization of the coating, painting, or impregnation, for instance by exposing the article to artificial or natural light or by heating it, or by employing both light and heat. In this case a portion of the unchanged methacrylic acid ester in the syrupy solution may or may not be evaporated while another portion may be converted into the solid polymerization product. The articles thus treated have imparted to them a very high resistance to external influences, e. g. resistance to water, acids, alkalis, and atmospheric changes.

The said syrupy mass can be mixed with comminuted matter, such, for instance, as ground cork, or ground wood, fibrous substances, mineral fillers, or the like, and the mixture be made into the proper shape and the unchanged methacrylic acid esters in the articles be converted, by suitable polymerization, into the solid final product.

It is also possible to start from solid, semisolid, or plastic polymerization products of the methacrylic acid esters, these being softened by heating them by themselves, or with suitable solvents, and using them in their softened state. On cooling, or on the evaporation of the diluent, which may still be present, the product is converted into the solid lacquer-form.

It is obvious that mixtures of various polymerized methacrylic acid esters can be used for lacquering, painting, or impregnating in accordance with this invention. It is likewise obvious that the wholly or partly polymerized esters can be mixed with suitable additional substances to modify the properties of the lacquering, painting, or impregnating materials in any desired manner. As additions of this kind oils should be mentioned (such, for instance, as castor oil), dyes, powdered substances (such as zinc oxide), camphor, camphor substitutes, and the like.

In accordance with this invention it is possible to obtain valuable products if the said polymers be dissolved, or softened, in suitable solvents and then be converted again to the solid state. The products thus obtained may be used for purposes for which cellulose esters have hitherto been used, namely, as substitutes for horn, amber, artificial resins, lacquers, for impregnation purposes, and also for the production of films, interlayer for safety glass, pressure adhesives, artificial threads, and the like.

The products thus formed have the advantage over products made from nitrocellulose in being less inflammable. By the addition of suitable agents, the strength and hardness of the products may be modified within wide limits so that it is possible to manufacture, both hard, hornlike substances, and soft, more pliable products. The products may also be modified by varying the conditions of the polymerization.

The monomer may be polymerized in the presence of a solvent and the solution used as such or the polymer recovered from the solution by evaporation or precipitation methods. In many cases, however, it is more profitable to use an amount of solvent insufficient to produce a freely flowing solution, so that soft plastic masses are obtained which can be pressed, kneaded, rolled or drawn into shape, or formed into blocks, plates, or films.

Plasticizers or other modifying agents may be added to the monomer prior to polymerization or directly to the polymerized product, it being generally desirable to employ a plasticizer which is soluble in the polymer and the monomer, altho it is not essential that the dual solubility characteristics be present. Thus, plasticizers or softening agents, such as, for example, camphor; phthalates, such as ethyl, propyl, isopropyl, butyl, isobutyl, cyclohexyl, methyl cyclohexyl, or benzyl phthalate or phthalates of the mixed type such as cyclohexyl butyl, benzyl butyl or butyl lauryl phthalate; esters of other dibasic acids, such as the ethyl, propyl, isopropyl, butyl, isobutyl cyclohexyl, methyl cyclohexyl or benzyl esters of succinic, fumaric, tartaric, adipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g. glycol and glycerol, such as glycol benzoate, glycol laevulinate, triacetin, tripropionin and tributyrin; substituted toluene sulphonamides, such as ethyl paratoluene sulphonamide; substituted amides, such as tetraethyl phthalamide, tetrabutyl succinamide, tetrabutyl adipamide, tetraethyl phthalamide; hydrocarbons, such as dixylyl ethane; halogenated hydrocarbons, such as chlorinated diphenyls and dichlordibenzyl; ether compounds such as dicresoxy ethyl ether; and drying, non-drying, or semi-drying oils, such as castor oil, cotton seed oil, linseed oil and the like. These additions also facilitate later mechanical treatment, as cutting sawing, and polishing.

The polymerized esters, mixtures of the polymerized esters with dissimilar polymerizable esters or other polymerizable compounds of methacrylic or acrylic acids, or vinyl compounds; or interpolymers of the esters with such other compounds may be used advantageously as safety glass interlayers. These polymerized esters, mixtures thereof, or interpolymers thereof may be plasticized or otherwise modified as desired. The compositions may be compounded with glass in an unpolymerized, partially polymerized, or completely polymerized condition. When compounding the safety glass with the unpolymerized or partially polymerized compositions, the polymerization may be effected by subjecting the sandwich of glass and compound to suitable application of light and/or heat.

When the term "poly" is employed in the specification and claims it refers only to the number of methacrylate groups attached to a designated alcohol, in contradistinction to the "polymerized" ester which is the union of two or more molecules.

From a consideration of the above specification it will be realized that various changes may be made in the process or product without departing from the invention or sacrificing any of its advantages.

I claim:

1. The polymeric methacrylic acid ester of an aliphatic polyhydric alcohol containing one unsubstituted hydroxyl group prepared by heating the monomeric ester to a temperature of from 60 to 100° C., in the presence of benzoyl peroxide.

2. The polymeric diethylene glycol monobutyl ether methacrylate prepared by heating the monomeric ester to a temperature of from 60 to 100° C., in the presence of benzoyl peroxide.

3. The polymeric ethylene glycol monoethyl ether methacrylate prepared by heating the monomeric ester to a temperature of from 60 to 100° C., in the presence of benzoyl peroxide.

4. The polymeric ethylene glycol monomethyl ether methacrylate prepared by heating the monomeric ester to a temperature of from 60 to 100° C., in the presence of benzoyl peroxide.

5. A molding composition comprising the polymeric methacrylic acid ester of an aliphatic polyhydric alcohol containing one unsubstituted hydroxyl group prepared by heating the monomeric ester to a temperature of from 60 to 100° C., in the presence of benzoyl peroxide.

6. The interpolymer of the methacrylic acid ester of an aliphatic polyhydric alcohol containing one unsubstituted hydroxyl group and a polymerizable derivative of an acid selected from the group consisting of acrylic and methacrylic acid prepared by heating the monomeric compounds to a temperature of from 60 to 100° C., in the presence of benzoyl peroxide.

EMMETTE F. IZARD.